(12) United States Patent
Rosenzweig et al.

(10) Patent No.: US 10,179,945 B2
(45) Date of Patent: Jan. 15, 2019

(54) CMAS RESISTANT THERMAL BARRIER COATINGS

(71) Applicant: GENERAL ELECTRIC COMPANY, Schenectady, NY (US)

(72) Inventors: Larry Steven Rosenzweig, Clifton Park, NY (US); James Anthony Ruud, Delmar, NY (US); Shankar Sivaramakrishnan, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 891 days.

(21) Appl. No.: 14/107,225

(22) Filed: Dec. 16, 2013

(65) Prior Publication Data
US 2015/0167141 A1   Jun. 18, 2015

(51) Int. Cl.
*C23C 4/12*     (2016.01)
*C23C 4/10*     (2016.01)
*F01D 25/00*    (2006.01)
*F01D 5/28*     (2006.01)
(Continued)

(52) U.S. Cl.
CPC .............. *C23C 4/127* (2013.01); *C23C 4/067* (2016.01); *C23C 4/134* (2016.01); *F01D 5/288* (2013.01); *Y10T 428/24802* (2015.01)

(58) Field of Classification Search
CPC .................................................... C23C 4/127
See application file for complete search history.

(56) References Cited

U.S. PATENT DOCUMENTS 5,035,923 A   7/1991  Sarin
5,773,141 A   6/1998  Hasz et al.
5,871,820 A   2/1999  Hasz et al.
(Continued)

OTHER PUBLICATIONS

Drexler, et al; "Air-Plasma-Sprayed Thermal Barrier Coatings that are Resistant to High-Temperature Attack by Glassy Deposits," Acta Materialia, vol. 58, Issue 20, pp. 6835-6844 (2010).
(Continued)

*Primary Examiner* — Ian A Rummel
(74) *Attorney, Agent, or Firm* — GE Global Patent Operation; John Darling

(57) ABSTRACT

The present application provides Calcia-Magnesia-Alumina-Silica (CMAS) (or molten silicate) resistant thermal barrier coatings (TBC). The coatings include elongate growth domains of non-equiaxed, randomly arranged overlapping grains or splats. The elongate growth domains include overlapping individual, randomly distributed splats of tough and soft phases. In some embodiments, the elongate growth domains are formed via air plasma spray. In some embodiments, the tough phases are at least partially stabilized zirconia and/or hafnia compositions, and the soft phases are CMAS (or molten silicate) reactive or resistant compositions. Within each elongate growth domain, the mixture of the tough and soft phases act together to limit penetration of CMAS and also provide sufficient domain toughness to minimize cracking forces produced during crystallization of infiltrated CMAS. The soft phases may react with the CMAS and increase its melting point, increase its viscosity, and reduce the destabilization of the tough phases.

17 Claims, 5 Drawing Sheets

(51) Int. Cl.
C23C 4/067 (2016.01)
C23C 4/134 (2016.01)

(56) References Cited

U.S. PATENT DOCUMENTS

| | | | |
|---|---|---|---|
| 6,117,560 A * | 9/2000 | Maloney | C23C 4/105 |
| | | | 416/241 B |
| 6,261,643 B1 | 7/2001 | Hasz et al. | |
| 6,497,920 B1 | 12/2002 | Pfaendtner et al. | |
| 7,862,901 B2 | 1/2011 | Darolia et al. | |
| 8,257,559 B2 | 9/2012 | Floyd et al. | |
| 2009/0280298 A1* | 11/2009 | Rosenzweig | C23C 30/00 |
| | | | 428/156 |
| 2009/0305866 A1* | 12/2009 | Ulion | C23C 14/0688 |
| | | | 501/87 |
| 2010/0081558 A1* | 4/2010 | Taylor | C04B 35/185 |
| | | | 501/135 |
| 2013/0095340 A1 | 4/2013 | Sivakumar et al. | |

OTHER PUBLICATIONS

Julie Marie Drexler; "Thermal Barrier Coatings Resistant to Glassy Deposits," Thesis—Ph. D in Materials Science and Engineering, Ohio State University, p. 212 (2011).

* cited by examiner

CMAS RESISTANT THERMAL BARRIER COATINGS

BACKGROUND

The present disclosure generally relates to configurations, components, assemblies and related methods of thermal barrier coatings, and in particular nanocomposite thermal barrier coatings with tough and soft or reactive phases in a strain tolerant microstructure.

Gas turbines are of prime importance in a range of industrial sectors, particularly for power generation and for propulsion of aircraft, marine craft, etc. The design of modern gas turbines is driven by the demand for higher turbine efficiency. It is widely recognized that turbine efficiency can be increased by operating the turbine at higher temperatures. In order to assure a satisfactory life span at these higher temperatures, thermal barrier coatings (hereinafter referred to as "TBCs") are applied to airfoils and combustion components, for example, of the turbine using various techniques. Ceramic thermal barrier coatings within such turbines represent the predominant area of their development, playing increasingly key roles in providing protection against over-heating and oxidation of metallic components.

A key concern for turbines utilized in both power generation and propulsion applications is with harmful effects of ingested species or particulate, often referred to as "dust," which can adhere to TBCs and damage them. Ingested dust melts during use of the turbine and typically forms a composition of molten dust referred to as "CMAS" (Calcia-Magnesia-Alumina-Silica). Calcia, magnesia, alumina and silica are the main ingredients of what is typically regarded as a family of particulate matter referred to as CMAS. However, other species of materials which may be referred to by the "CMAS" classification include volcanic ash, salt, and sulfur. Ingested CMAS induce degradation in both unprotected metallic alloys and ceramic coatings, such as TBCs. For example, a chief mode of failure of ceramic layers, and particularly TBCs, due to CMAS ingestion is loss of TBC compliance. Typically, the molten CMAS penetrates and fills the pores of the TBC structure. The penetrated CMAS then solidifies within the pores as the TBC cools. As another example, CMAS ingestion can damage ceramic layers, and particularly TBCs, by promoting sintering and thereby making them prone to spallation. Such degradation commonly arises when ingested particulate adheres to the coating and either creates a CMAS-rich outer layer or leads to diffusion into the coating of these oxides along internal grain boundaries, free surfaces (e.g., pores) or open defects. These oxides do not readily dissolve in the zirconia lattice, but tend to form vitreous phases, where they can accelerate sintering (particularly if significant levels of "liquid" phases are created).

One TBC category in industrial use is yttria-stabilized zirconia (YSZ) based TBCs, such as 7YSZ which offers chemical stability, low thermal conductivity and relatively high thermal expansivity that reduces coating-substrate thermal mismatch strains during heating and cooling. Air plasma spraying (APS) is widely used to produce such YSZ-based coatings. Unfortunately, conventional YSZ-based thermal barrier coatings deposited via APS have been shown to not include sufficient resistance to spallation when CMAS is ingested from the environment, as discussed above. Electron-beam physical vapor deposition (EBPVD) of YSZ-based TBCs has shown better spallation resistance against CMAS ingestion than APS applied coatings. However, although PVD coatings also provide attractive strain tolerance properties they tend to be relatively expensive and applicable to only relatively small components when compared with APS as the PVD processes requires a vacuum chamber and supporting equipment. Another newer technique to combat spallation resulting from CMAS ingestion involves TBC compositions with higher rare earth contents as compared to prior TBCs. These high rare earth TBCs are designed to react with ingested CMAS, and/or resist reactions with CMAS (or molten silicate), and thereby limit its penetration. These high rare earth TBCs, however, have much lower fracture toughness than conventional YSZ-based thermal barrier coatings, such as 7YSZ, and are thereby prone to thermo-mechanical stresses during engine operation.

As a result, a need exists for thermal barrier coatings and related methods that are resistant to CMAS ingestion (i.e., spallation resistant), include high strain tolerance, are scalable (i.e., compatible with large components), and are relatively inexpensive as compared with prior art thermal barrier coatings.

BRIEF DESCRIPTION

In one aspect, thermal barrier coatings are disclosed. The coatings include a plurality of elongate material growth domains defined between domain boundaries. The domains have an intra-domain density of at least about 75%. The domains include individual, randomly distributed splats of tough and soft phases stacked throughout the growth domains. The tough phases are at least one of partially stabilized zirconia compositions and partially stabilized hafnia compositions, and the soft phases are at least one of CMAS reactive compositions and CMAS resistant compositions.

In another aspect, articles for use at elevated temperatures are disclosed. The articles include a substrate and a thermal barrier coating disposed on the substrate. The coating includes a plurality of elongate material growth domains of at least about 75% density defined between domain boundaries. The coating also includes individual, randomly distributed first and second splats. The first splats are at least one of partially stabilized zirconia compositions and partially stabilized hafnia compositions, and the second plats are at least one of CMAS reactive compositions and CMAS resistant compositions.

In another aspect, methods of forming a thermal barrier coating on a substrate are disclosed. The method includes obtaining a substrate and obtaining a feedstock. The feedstock includes about micron or sub-micron ceramic particles of tough and soft phases suspended in a liquid agent. The tough phases are at least one of partially stabilized zirconia compositions and partially stabilized hafnia compositions, and the soft phases are at least one of CMAS reactive compositions and CMAS resistant compositions. The methods also include utilizing an air plasma spray apparatus to heat and deposit the tough and soft phases of the feedstock on the substrate in randomly distributed overlapping splats that form a plurality of elongate material growth domains of at least about 75% density defined between domain boundaries.

These and other objects, features and advantages of this disclosure will become apparent from the following detailed description of the various aspects of the disclosure taken in conjunction with the accompanying drawings.

DRAWINGS

DETAILED DESCRIPTION

Figure 1A:
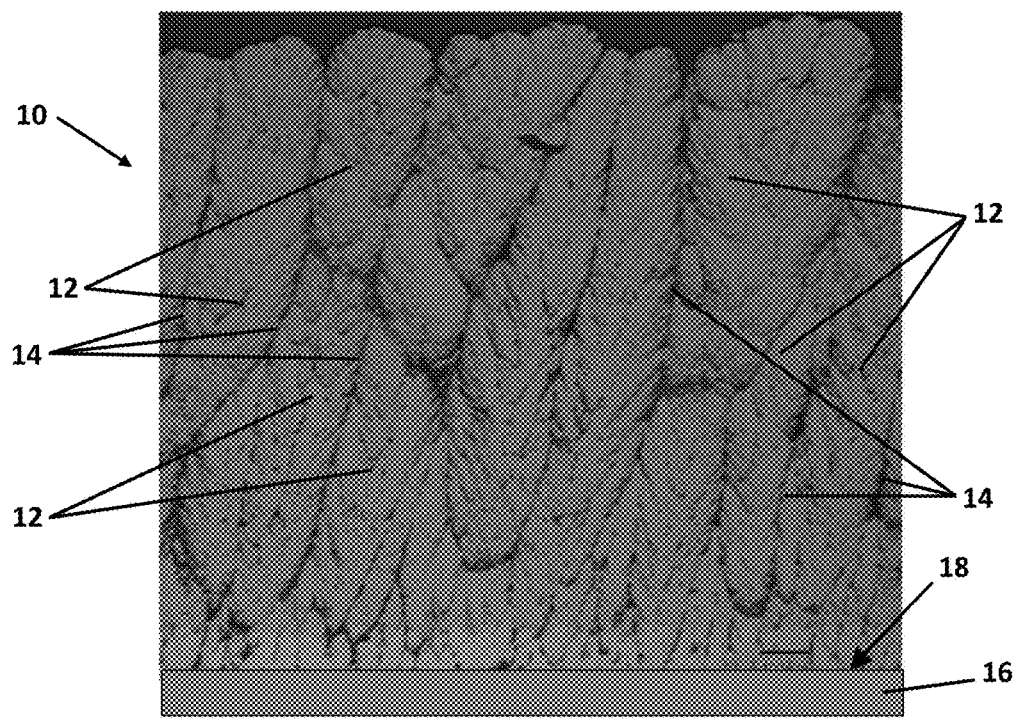
FIGS. 1A and 1B are yttrium aluminum garnet (YAG) back-scatter detector (BSE) images showing the cross-sec tion of elongate growth domains of an exemplary embodiment of an air plasma sprayed thermal barrier coating (TBC) according to the present disclosure.

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

As discussed above, conventional air plasma sprayed (APS) thermal barrier coatings (TBC) have limited spallation resistance against CMAS ingestion in modern turbines. This disclosure provides TBCs with a thermo-mechanically compliant composite microstructure with enhanced chemical resistance utilizing air plasma spray methods and suspension feedstocks consisting of dispersed micron or submicron ceramic particles. In some embodiments, the suspension feedstock includes one or more partially stabilized zirconia composition and/or partially stabilized hafnia composition (or "tough" phase) and one or more CMAS (or molten silicate) reactive or resistant composition (or "soft" phase). In some embodiments, the partially stabilized zirconia and/or hafnia composition (or "soft" phase) is a zirconia and/or hafnia composition that includes a sufficient amount stabilizer oxides to form and retain a metastable t' tetragonal (t-prime) phase structure during deposition and turbine service exposures, but not an amount that produces a fully stabilized cubic phase structure. In some embodiments, without stabilizer additions, zirconia and hafnia compositions have a monoclinic structure at room temperature and do not have sufficient thermal or mechanical properties to function as a TBC in high temperature applications. The amount of stabilizer is that is required or needed to produce a partially stabilized or fully stabilized structure (e.g., zirconia or hathia) is dependent upon, for example, the type of stabilizer. In some embodiments, while partially stabilized zirconia and hafnia compositions have desirable thermal and mechanical properties for high-temperature TBC applications, their thermal and mechanical properties may vary depending upon stabilizer composition(s) and quantity, for example. Fully stabilized zirconia or hafnia compositions, or cubic structures, while generally have adequate thermal properties, they may generally lack sufficient mechanical toughness for most high-temperature TBC applications.

In some embodiments, the coatings of the present invention may owe their microstructure at least in part to the processing used in their fabrication. APS, which, as discussed above, provides certain economic and manufacturing advantages over processes which require the use of vacuum equipment, such as PVD or vacuum plasma spray deposition. In particular, the process uses a feedstock comprising fine particles suspended in a liquid agent (e.g., alcohol, water or mixtures of water and alcohol) that is fed to a plasma spray torch in a controlled manner and injected into the plasma plume for deposition onto a substrate. The feedstock may include two or more individual liquid feedstocks that are fed directly into the plasma plume. The two or more feedstocks may be pre-mixed and the mixture fed into the plasma plume, or the two or more feedstocks may be separate and distinct feedstocks which are individually fed into the plasma plume (thereby "mixed" in the plasma plume and/or as they are applied to the substrate). In these ways, the fine particles of the feedstock are melted individually and thrown or otherwise directed to, and thereby on, a substrate. The particles may have a median diameter typically, but not necessarily, equal to or less than about 0.5 micrometers. Those skilled in the art will appreciate that many different processing parameters are available for adjustment in a given air plasma spray (APS) process, and that various combinations of these parameters may result in coatings with different structures and properties.

In some embodiments, the substrate or article 16 to which the coating 10 is applied, as shown in FIG. 1A, may be any suitable support material, but in particular embodiments comprises a high temperature alloy, such as a nickel-based or cobalt-based superalloy. In some embodiments, the substrate 16 may be a component of a gas turbine assembly, including, for instance, a gas turbine assembly for power generation or for propulsion. Exemplary components of turbines may include blades, stator vanes, and combustion components. In some embodiments, the substrate 16 further comprises a bondcoat disposed between coating 10 and the substrate 16. Bondcoats, such as MCrAlY or aluminide coatings, may be utilized to provide oxidation resistance to the substrate 16 and/or to enhance adhesion of the ceramic TBC(s) 10.

Figure 1B:
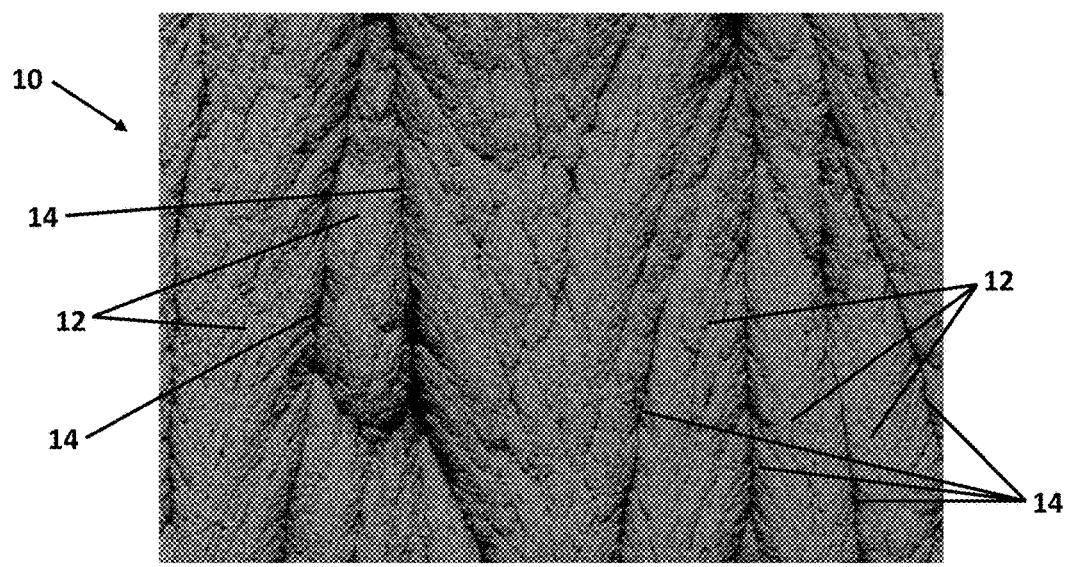

In one embodiment, as depicted in the YAG BSE images of FIGS. 1A and 1B of the cross-section of an exemplary embodiment of an exemplary air plasma sprayed coating 10, the exemplary coating 10 comprises a plurality of elongate material growth domains 12, as described in U.S. Patent Application Publication No. 2009/0280298 to Rosenzweig et al., which is incorporated herein in its entirety. As used herein, the term "elongate" refers to a structure having an aspect ratio of greater than 1. The exemplary growth domains 12 are generally vertically oriented, such that their longest axes extend in a direction at least generally away from the interface 18 and substrate 16 to which the coating is applied, as shown in FIGS. 1A and 1B.

Figure 3A:
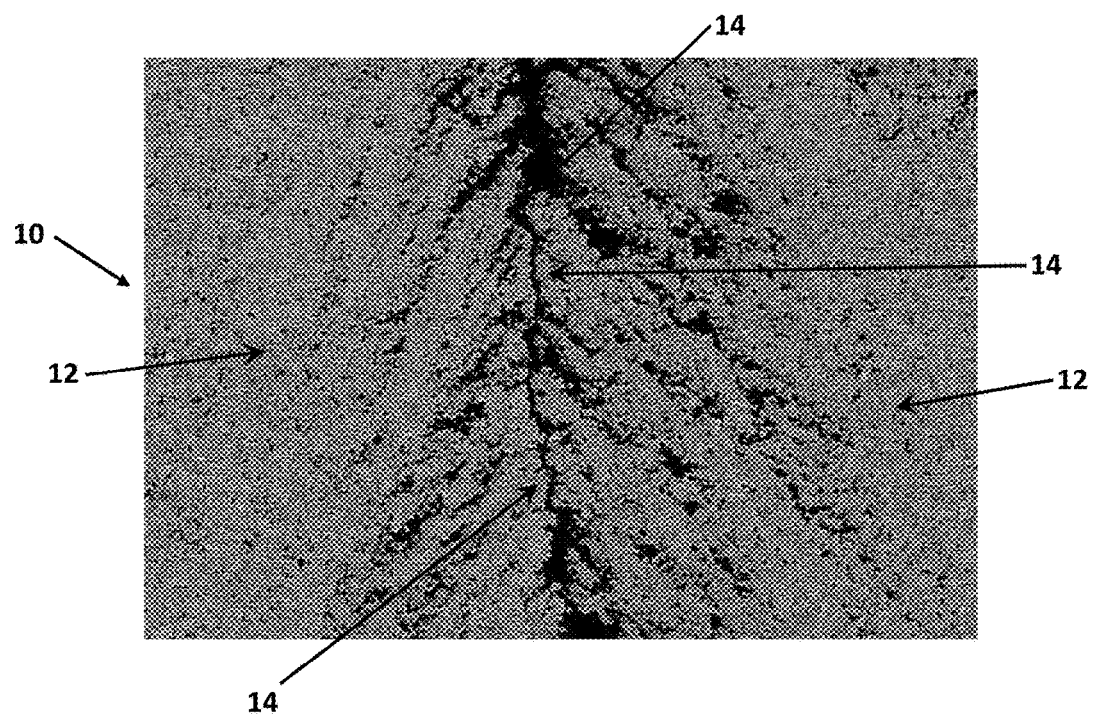
FIGS. 3A and 3B are YAG BSE images showing the cross-section of a boundary between two elongate growth domains of the exemplary air plasma sprayed TBC of FIGS. 1A and 1B according to the present disclosure.
Figure 3B:
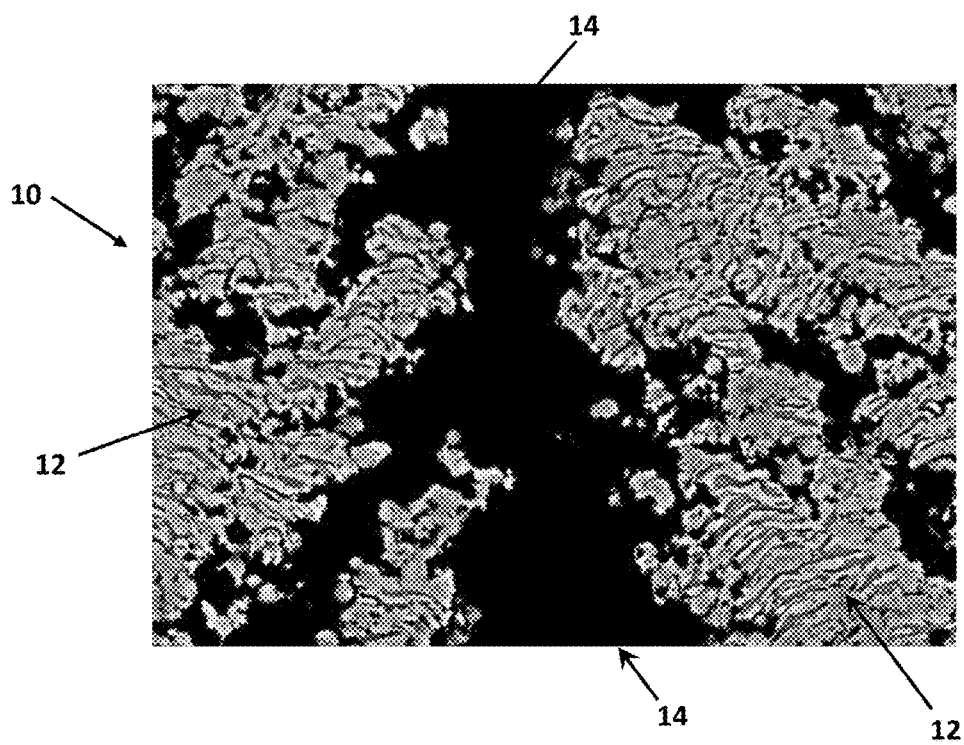

As also shown in FIGS. 1A and 1B, and additionally in FIGS. 3A and 3B, in some embodiments as the coating material is deposited to form the coating 10 the material accumulates in exemplary domains 12 defined as regions of comparatively high density separated by exemplary domain boundaries 14 of comparatively substantially low (though not necessarily zero) density. In some embodiments, the domain boundaries 14 may include a coating 10 material density of less than about 25%, or less than about 10%, or less than about 5%. The domain boundaries 14 may, in some embodiments, extend for a length equal to at least about 50% of the coating thickness of the coating 10, and at least about 75% of the thickness in some embodiments. Generally, the strain tolerance of exemplary coating 10 is enhanced by the presence of relatively long, well-defined boundaries 14.

Figure 2A:
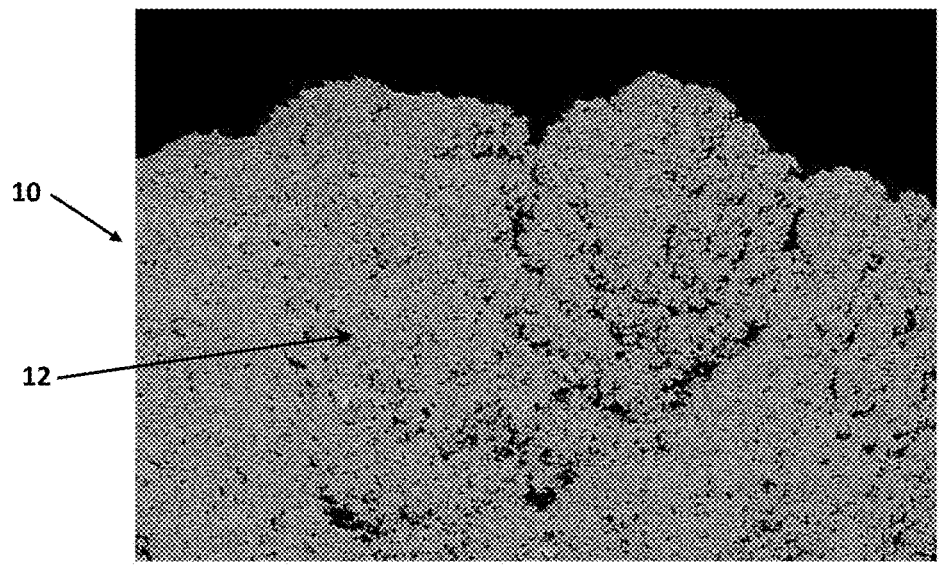
FIGS. 2A-2C are YAG BSE images showing the cross-section of interior structure of an elongate growth domain of the exemplary air plasma sprayed TBC of FIGS. 1A and 1B according to the present disclosure.
Figure 2B:
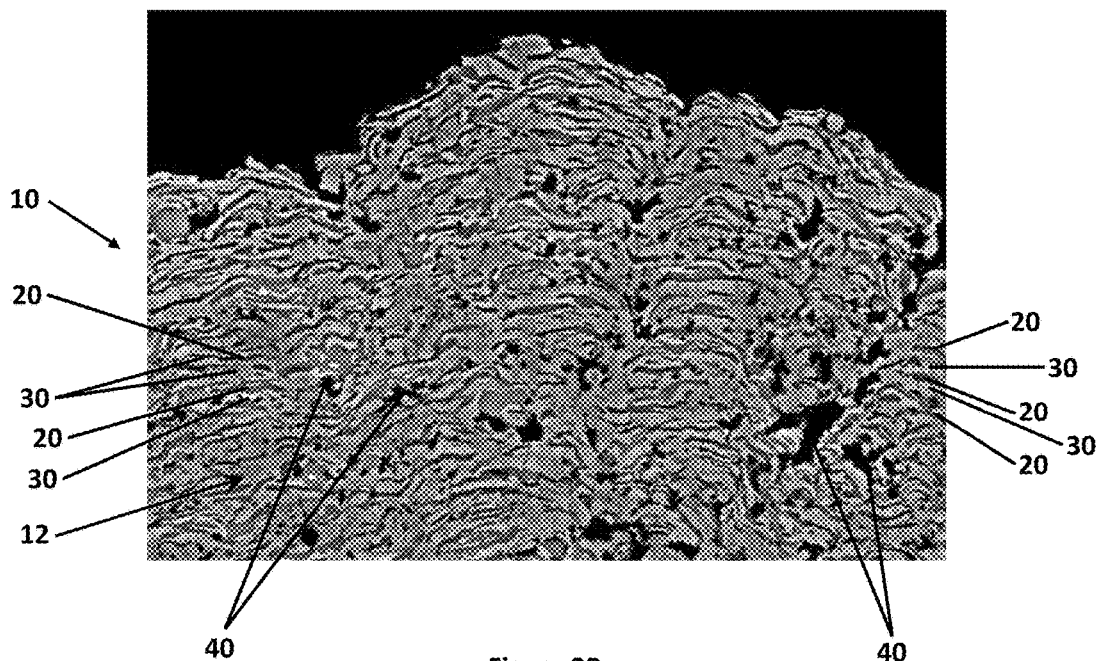
Figure 2C:
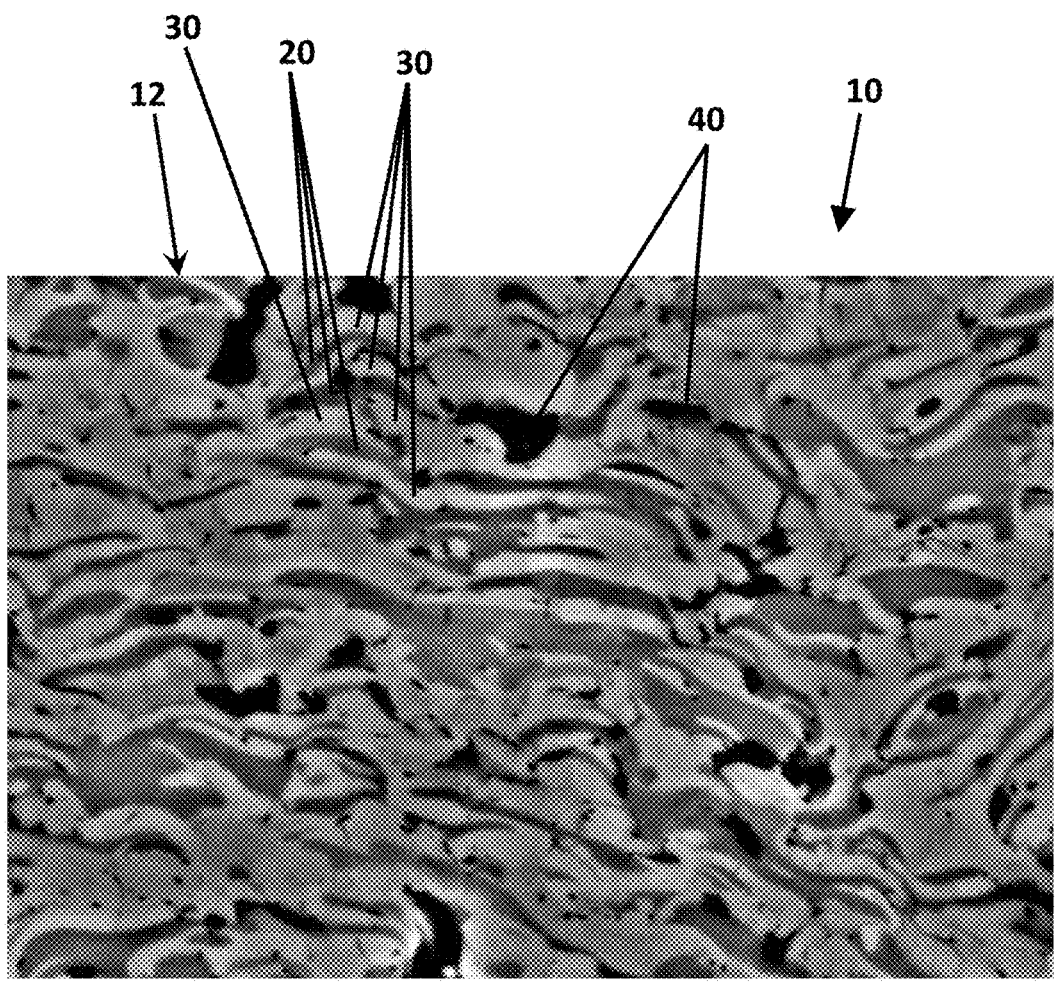

In some embodiments, the density of material contained within domains 12 (e.g., tough and soft phases), also referred to herein as "intra-domain density," is at least about 75% of theoretical density, as shown in FIGS. 2A-2C. In some embodiments, this density is even higher, such as greater than 85% and, in certain embodiments greater than 95%. A high intra-domain density may provide desirable resistance to erosion and may enhance cohesive strength of the exemplary coating 10.

As discussed above, the presence of domain boundaries 14 (see FIGS. 1A, 1B, 3A and 3B) may provide desirable compliance and strain tolerance properties for exemplary coating 10. For example, a coating with narrower domains may have a greater density of domain boundaries. In some embodiments, the width of the domains 12 can be in the range from about 5 micrometers to about 350 micrometers. In some embodiments, the width of the domains 12 can be in the range from about 20 micrometers to about 100 micrometers. In some embodiments, the width of the domains 12 can be in the range from about 30 micrometers to about 90 micrometers. In some embodiments, the width of the domains 12 can be in the range from about 40 micrometers to about 80 micrometers. In some embodiments, the width of the domains 12 can be in the range from about 100 micrometers to about 350 micrometers. Domain width as used herein may be measured based on the average number of boundaries 14 respectively intercepted by lines of known length drawn along a cross section of the coating 10 at 33% of the coating thickness and at 67% of the coating thickness; mean domain width is simply the known length divided by the number of intercepted boundaries 14. In certain embodiments, at least about 50% by volume of the coating 10 contains domains 12; thus it is not necessary that the entire coating 10 comprise the microstructure described herein. In some embodiments, however, the advantages provided by this unique structure are such that substantially all of the coating 10 comprises the described microstructure.

In some embodiments the exemplary domains 12 of the coating 10 may be formed by the deposition mechanism of the coating 10, such as substantially by accumulation of pre-condensed matter at a growth surface. In such an embodiment, "pre-condensed matter" refers to solid and/or liquid phases or matter that impinges upon a growth surface (e.g., the substrate 16 and or already deposited phases), rather than matter that condenses at the growth surface from the vapor phase. For example, exemplary domains 12 may comprise a plurality of at least partially melted and solidified particles (meaning the particles were at least partially liquid before impinging the surface and finally fully solidifying), which are often (though not always) discernable as "prior particles" in the microstructure of coating 10 via microscopy techniques, as shown in the cross-sectional YAG BSE images of the exemplary domains 12 of the coating 10 in FIGS. 2B, 2C and 3B. In certain embodiments, at least 50% of the material present in the domains 12 comprises at least partially melted and solidified particles. In some embodiments at least about 80% of the material present in the domains 12 comprises at least partially melted and/or solidified particles. In some embodiments substantially all of the material in domains 12 is made of at least partially melted and solidified particles.

In some embodiments, the exemplary domains 12 generally lack substantial crystallographic texture, in stark contrast to coatings deposited via a vapor deposition mechanism. Instead, in some embodiments the exemplary domains 12 typically have a substantially isotropic crystallographic orientation. In this context, a "substantially isotropic crystallographic orientation" means that the material in question has a texture coefficient in the range from about 0.75 to about 1.25, as that coefficient is defined in D. S. Rickerby, A. M. Jones and B. A. Bellamy, *Surface and Coatings Technology*, 37, 111-137 (1989).

In contrast to dense vertically cracked coatings and other coatings including growth domains (e.g., the coatings of the '298 patent publication discussed above), exemplary coatings 10 of the present disclosure are generally characterized by growth domains 12 that include randomly arranged or distributed grains or splats (discussed further below) which substantially lack an equiaxed morphology (or substantially include "non-equiaxed" grains) with the presence of distinct lamellar features. "Non-equiaxed" (or lack of an equiaxed grain or splat morphology) being defined herein as grains or splats having a median aspect ratio (width/length) greater than or equal to about 3:1, and "randomly arranged" or "randomly distributed" stacked splats being defined herein as the general randomness of the overlapping and/or positioning of grains or splats relative to one another. In some embodiments, the stacked individual distinct grains or splats of tough and soft phases may each include or define a median aspect ratio (width/length) greater than or equal to about 5:1. Although the overlapping and/or positioning of the grains or lamellar splats may be substantially random, the long axes (e.g., width) of the grains or lamellar splats of the exemplary coatings 10 disclosed herein may be generally oriented within about 45 degrees to perpendicular (i.e., 90 degrees) with respect to the direction in which they are applied to, or deposited on, a substrate (e.g., the direction of a torch spray plume, such as a plasma plume when applied via APS), stacked or overlapped on the substrate and each other, and/or the thickness of the as-applied coating 10. In some embodiments, the domains may include at least about 75% non-equiaxed grains or lamellar splats, preferably at least about 85% non-equiaxed grains or lamellar splats, and more preferably at least about 95% non-equiaxed grains or lamellar splats.

The suspension feedstock utilized in an APS process to form the exemplary coatings 10 of the present disclosure may include one or more partially stabilized zirconia tough phase and/or one or more partially stabilized hafnia tough phase, and one or more CMAS (or molten silicate) reactive or resistant soft phase. During the APS process, the tough and soft phases form at least partially melted, and eventually solidified, particles of the domains 12 (see FIGS. 2B, 2C and 3B). In some embodiments, the feedstock utilized by the APS process to form the domains 12 of tough and soft phases may be a mixture of the tough and soft phases that is fed into the torch plume of the APS process, such as a plasma plume. In some other embodiments, the feedstock utilized by the APS process to form the growth domains 12 of tough and soft phases may be two or more separate and distinct individual feedstocks that each include only one of the tough and soft phases (as opposed to a mixture of tough and soft phases). In some such embodiments, the individual tough and soft phase feedstocks may be separately directed into the torch plume of the APS process at about the same time to form the growth domains 12.

As shown in FIGS. 2B and 2C, for example, each elongate growth domain 12 may include individual, randomly distributed and overlapped splats 20, 30 that are stacked throughout the growth domains 12 (i.e., are stacked or overlapped to form the thickness of the domains 12 and coating 10). Further, the growth domains 12 may include voids or gaps 40 interspersed with the randomly distributed splats 20, 30. In some embodiments the randomly distributed splats 20, 30 are formed by melted, or partially melted, tough 20 and soft 30 phases as they impact tough 20 and soft phases 30 that have already been deposited on the substrate 16. As shown in FIGS. 2B and 2C, for example, the splats 20, 30 may be substantially thin and wide after impacting the substrate 16 and or a previously applied splat 20, 30, and may or may not be connected to one or more other splat 20, 30 of the same type. In this way, the splats 20, 30 correspond to the tough and soft phases of the domains 12 of the coating 10 (and the feedstock utilized to form the coating 10) and are randomly overlapped as they are applied to the substrate 16 and previously applied or formed splats 20, 30. In some embodiments, the stacked, randomly distributed splats of the tough 20 and soft 30 phases of the exemplary coating 10 form elongate growth domains 12 within the range of about 5 microns to about 150 microns in thickness measured from the interface 18 of the domains 12 with the substrate 16.

In some embodiments the exemplary coating 10 includes an overall microstructure of predominantly elongated growth domains of non-equiaxed grains which provides advantageous strain tolerance. In some embodiments within each elongate growth domain 12 of the exemplary coating 10, the mixture of tough phases 20 and CMAS (or molten silicate) reactive or resistant soft phases 30 act together to limit penetration of CMAS into the coating 10 during use. Further, in some such embodiments the tough phases 20 and CMAS (or molten silicate) reactive or resistant soft phases 30 act together to provide sufficient domain toughness to minimize cracking forces produced during crystallization of any infiltrated CMAS into the elongate growth domain boundaries 14 or any open defect with the coating 10 microstructure. In some embodiment, the CMAS (or molten silicate) reactive or resistant soft phases 30 are effective in reacting with or effecting any infiltrated CMAS to increase its melting point, increase its viscosity, reduce overall CMAS infiltration, and reduce the destabilization of the tough phases 20 of the coating 10.

In this way, the exemplary coatings 10 of the present disclosure provide tough phases 20 within an elongate growth domain 12 structure that provides the necessary toughness to withstand thermo mechanical stresses during use, such as use in a turbine. Inter-dispersion of the soft or reactive phases 30 of the exemplary coatings 10 provide chemical reaction with infiltrated CMAS, such as CMAS deposited on or in the coating 10. As a result, the overall microstructure (elongate growth domains 12, as discussed above) along with the mixed chemical composition of tough 20 and soft 30 phases functionally provides superior resistance to spallation damage caused by the deposition and melting of CMAS on substrates or components 16 coated with the thermal barrier coating 10.

In some embodiments, the tough phase 20 of the suspension feedstock for the APS process utilized to form the exemplary coating 10, and thereby the tough phase splats 20 of the elongate growth domains 12 of the formed thermal barrier coating 10, (collectively referred to herein as the tough phase 20 of the coating 10) is formed of at least one of partially stabilized zirconia and partially stabilized hafnia. In some such embodiments, the zirconia-based or hafnia-based tough phases 20 of the coating 10 are stabilized by at least one of yttria, magnesia, calcia, ceria, lanthana, neodymia, europia, gadolinia, erbia, dysprosia, ytterbia, scandia, samaria, and lutetia. In some embodiments, the stabilizer of the zirconia-based and/or hafnia-based tough phase of the coating 10 may be incorporated individually or in combination depending upon the desired properties. In some embodiments, the tough phase 20 of the exemplary coating 10 is 7YSZ.

In some embodiments, the suspension feedstock for the APS process utilized to form the exemplary coating 10, and thereby the formed thermal barrier coating 10, includes more of the tough phase 20 than the soft phase 30. In some embodiments, the coating 10 includes at least about 25 wt % tough phase 20, and preferable at least about 50 wt % tough phase 20, and more particularly at least about 75 wt % tough phase 20. In some embodiments, the exemplary coating 10 includes about 54 wt % tough phase 20 and about 46% soft phase 30.

In some embodiments, the CMAS (or molten silicate) reactive or resistant soft phase 30 of the suspension feedstock for the APS process utilized to form the exemplary coating 10, and thereby the soft phase splats 30 of the elongate growth domains 12 of the formed thermal barrier coating 10, (collectively referred to herein as the tough phase 30 of the coating 10) is formed of at least one oxide that reacts with or otherwise effects the properties of CMAS. In some such embodiments, the CMAS (or molten silicate) reactive or resistant soft phase 30 of the coating 10 is one or more of various oxides such as hafnia, yttria, ytterbia, zirconia, lanthana, ceria, and alumina. In some embodiments, the soft phase 30 of the exemplary coating 10 is $Y_2O_3$.

In some embodiments of the coating 10, the CMAS (or molten silicate) reactive or resistant soft phase 30 thereof is at least one molten silicate resistant material. In some such embodiments, the soft phase 30 of the exemplary coating 10 includes at least one material selected from the group consisting of zirconia, hafnia, and titania stabilized with a rare earth material which comprises at least one oxide selected from the group consisting of calcium, magnesium, lanthanum, cerium, praseodymium, neodymium, promethium, samarium, europium, gadolinium, terbium, dysprosium, holmium, erbium, thulium, ytterbium, yttrium lutetium, scandium, indium, and mixtures thereof. In some such embodiments, the soft phase 30 of the exemplary coating 10 includes at least one oxide of a material selected from the group consisting of aluminum, calcium, magnesium, silicon, tantalum, titanium, cerium, praseodymium, neodymium, promethium, samarium, europium, terbium, dysprosium, holmium, erbium, thulium, yttrium, ytterbium, lutetium, scandium, indium, hafnium, gadolinium and mixtures thereof. In some such embodiments, the soft phase 30 of the exemplary coating 10 includes at least one sodium containing compound selected from the group consisting of sodium oxide, sodium silicate, sodium titanate, and mixtures thereof.

In some such embodiments, the soft phase 30 of the exemplary coating 10 includes at least one garnet having the formula $A_3B_3X_3O_{12}$ where A comprises at least one of the metals selected from the group consisting of $Ca^{+2}$, $Gd^{+3}$, $In^{+3}$, $Mg^{+2}$, $Na^+$, $K^+$, $Fe^{+2}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Zr^{+4}$, $Hf^{+4}$, $Gd^{+3}$, $Al+3$, $Fe^{+3}$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^{+2}$, $Yb^{+2}$, $Lu^{+2}$, $In^{+3}$, $Sc^{+2}$, $Y^{+2}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Fe^{+3}$, $Cr^{+3}$, $Sc^{+3}$, $Y^{+3}$, $V^{+3}$, $Nb^{+3}$, $Cr^{+3}$, $Mo^{+3}$, $W^3$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

In some such embodiments, the soft phase 30 of the exemplary coating 10 includes an oxyapatite having the formula $A_4B_6X_6O_{26}$ where A comprises at least one of the metals selected from the group consisting of is $Ca^{+2}$, $Mg^{+2}$, $Fe^{+2}$, $Na^+$, $K^+$, $Gd^{+3}$, $Zr^{+4}$, $Hf^{+4}$, $Y^{+2}$, $Sc^{+2}$, $Sc^{+3}$, $In+3$, $La^{+2}$, $Ce^{+2}$, $Pr^{+2}$, $Nd^{+2}$, $Pm^{+2}$, $Sm^{+2}$, $Eu^{+2}$, $Gd^{+2}$, $Tb^{+2}$, $Dy^{+2}$, $Ho^{+2}$, $Er^{+2}$, $Tm^2$, $Yb^{+2}$, $Lu^{+2}$, $Sc^{+2}$, $Y^{+2}$, $Ti^{+2}$, $Zr^{+2}$, $Hf^{+2}$, $V^{+2}$, $Ta^{+2}$, $Cr^{+2}$, $W^{+2}$, $Mn^{+2}$, $Tc^{+2}$, $Re^{+2}$, $Fe^{+2}$, $Os^{+2}$, $Co^{+2}$, $Ir^{+2}$, $Ni^{+2}$, $Zn^{+2}$, and $Cd^{+2}$; where B comprises at least one of the metals selected from the group consisting of $Gd^{+3}$, $Y^{+2}$, $Sc^{+2}$, $In^{+3}$, $Zr^{+4}$, $Hf^{+4}$, $Cr^{+3}$, $Sc^{+3}$, $Y^{+3}$, $V^{+3}$, $Nb^{+3}$, $Cr^{+3}$, $Mo^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; where X comprises at least one of the metals selected from the group consisting of $Si^{+4}$, $Ti^{+4}$, $Al^{+4}$, $Cr^{+3}$, $Sc^{+3}$, $Y^{+3}$, $V^{+3}$, $Nb^{+3}$, $Cr^{+3}$, $Mo^{+3}$, $W^{+3}$, $Mn^{+3}$, $Fe^{+3}$, $Ru^{+3}$, $Co^{+3}$, $Rh^{+3}$, $Ir^{+3}$, $Ni^{+3}$, and $Au^{+3}$; and where O is oxygen.

In some such embodiments, the soft phase 30 of the exemplary coating 10 includes a titanate mixed with at least one oxide comprising at least one oxide of a material selected from the group consisting of lanthanum, cerium, praseodymium, neodymium, promethium, samarium, europium, gadolinium, terbium, dysprosium, holmium, erbium, thulium, ytterbium, lutetium, scandium, indium, yttrium, and mixtures thereof. In some such embodiments, the soft phase 30 of the exemplary coating 10 includes a metal carbide from the group consisting of silicon carbide, tantalum carbide, titanium carbide, tungsten carbide, silicon oxycarbide, and mixtures thereof. In some such embodiments, the soft phase 30 of the exemplary coating 10 includes is a metal nitride from the group consisting of silicon nitride, zirconium nitride, tantalum nitride, boron nitride, and mixtures thereof.

In some such embodiments, the soft phase 30 of the exemplary coating 10 includes a metal silicide from the group consisting of chromium silicide, molybdenum silicide, tantalum silicide, titanium silicide, tungsten silicide, zirconium silicide, and mixtures thereof. In some such embodiments, the soft phase 30 of the exemplary coating 10 includes 3-70 mol % gadolinia, balance hafnia. In some such embodiments, the soft phase 30 of the exemplary coating 10 includes gadolinia and zirconia and has a cubic crystal structure. In some such embodiments, the soft phase 30 of the exemplary coating 10 includes a material with a cubic pyrochlore structure.

Figure 4:
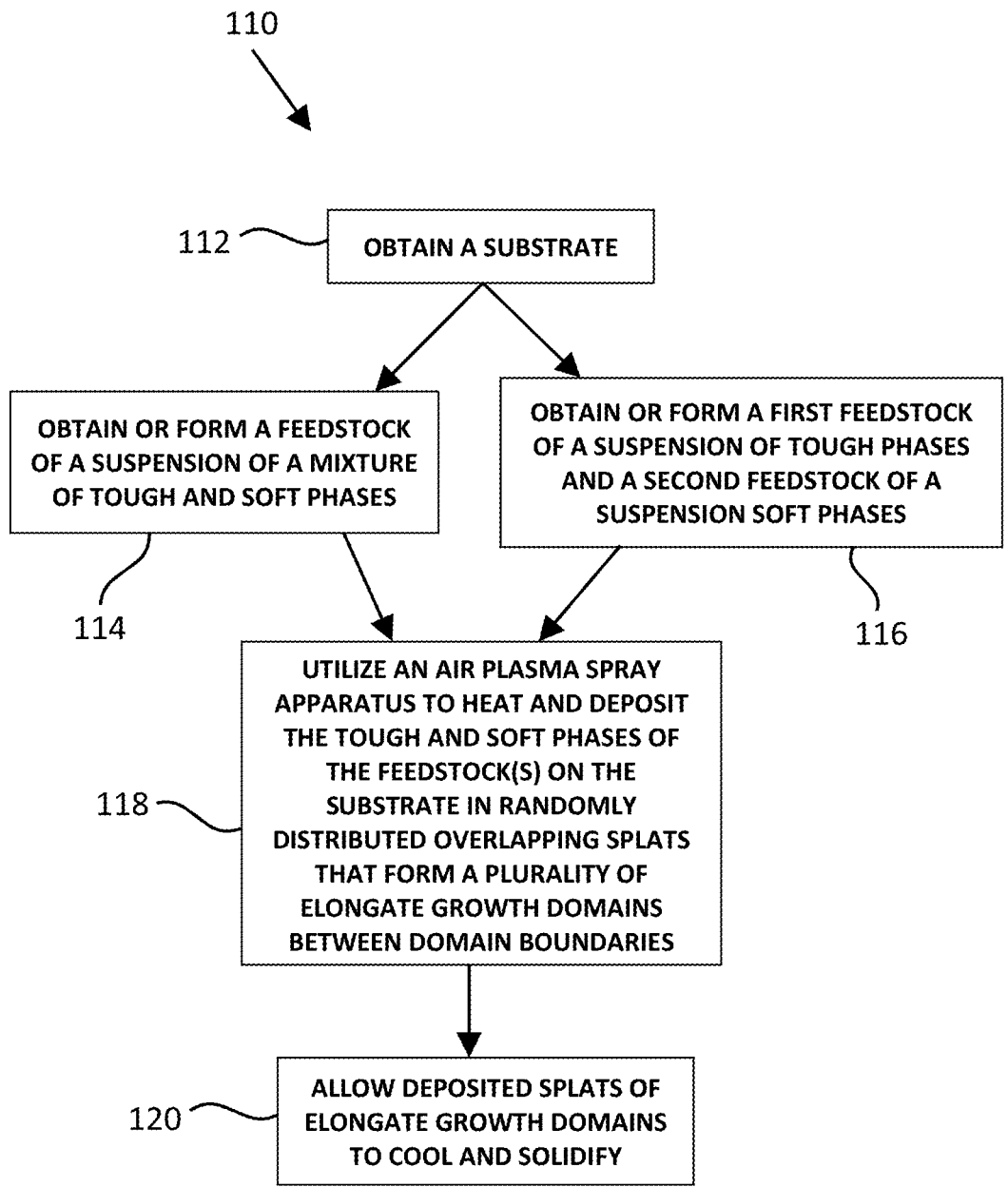
FIG. 4 is a diagram illustrating an exemplary method of forming an air plasma sprayed TBC according to the present disclosure on a substrate.

FIG. 4 illustrates exemplary methods of forming a TBC of the present disclosure on a substrate. The exemplary methods are referenced generally by reference numeral 110. As shown in FIG. 4, the exemplary methods 110 of forming a TBC, such as the coating 10 discussed above, include obtaining 112 a substrate to coat with the TBC. Obtaining 112 the substrate may include forming the substrate or obtain a pre-made substrate. The substrate may be any material or combinations of materials. In some embodiments, the substrate may be a metallic substrate. In some embodiments, obtaining 112 the substrate may include forming or obtaining a bondcoat on an upper surface of the substrate.

As shown in FIG. 4, the exemplary methods 110 of forming a TBC on a substrate include obtaining 114/116 a feedstock of tough and soft phases. In some embodiments, obtaining 114/116 one or more feedstock of tough and soft phases may include obtaining or forming one or more feedstock that includes tough and/or soft phases suspended in a liquid agent. The suspension(s) may include of about micron or sub-micron ceramic particles. As discussed above, the tough phases may be at least one of partially stabilized zirconia compositions and partially stabilized hafnia compositions. In some embodiments, the tough phases may be stabilized by at least one of yttria, magnesia, calcia, ceria, lanthana, neodymia, europia, gadolinia, erbia, dysprosia, ytterbia, scandia, samaria and lutetia. As also discussed above, the soft phases may be at least one of CMAS reactive compositions and CMAS resistant compositions. In some embodiments, the soft phases may be molten silicate resistant compositions.

In some embodiments, as shown in FIG. 4, obtaining 114/116 a feedstock of tough and soft phases may include obtaining or forming 114 a feedstock including a mixture of the tough and soft phase. In some embodiments, as also shown in FIG. 4, obtaining 114/116 a feedstock of tough and soft phases may include obtaining or forming 116 a first distinct feedstock including the tough phases and a second distinct feedstock including the soft phases.

The exemplary methods 110 of forming a TBC on a substrate may include utilizing 118 an air plasma spray apparatus to heat and deposit the tough and soft phases of the feedstock or feedstocks on the substrate (e.g., on an upper surface of the substrate or a bondcoat on the substrate), as shown in FIG. 4. In some embodiments, utilizing 118 an air plasma spray apparatus to heat and deposit the tough and soft phases of the feedstock or feedstocks on the substrate in randomly distributed overlapping splats of the tough and soft phases that form a plurality of elongate growth domains between domain boundaries. In some such embodiments, the elongate material growth domains include at least about 75% density defined between the domain boundaries. In some embodiments, at least about 75% of the splats of the elongate growth domains include a width to length aspect ratio of greater than or equal to about 3:1 and a substantially isotropic crystallographic orientation. In some embodiments, the widths of the splats are oriented within the range of about 45 degrees to about 90 degrees with respect to the direction in which the tough and soft phases are deposited on the substrate from the air plasma spray apparatus.

In some embodiments, utilizing 18 an air plasma spray apparatus to heat and deposit the tough and soft phases of a feedstock on the substrate includes introducing a feedstock of a mixture of the tough and soft phases into a plasma plume of the air plasma spray apparatus. In some other embodiments, utilizing 18 an air plasma spray apparatus to heat and deposit the tough and soft phases of feedstocks on the substrate includes introducing the individual first and second feedstocks into a plasma plume of the air plasma spray apparatus at about the same time.

As shown in FIG. 4, after the utilizing 118 an air plasma spray apparatus to heat and deposit the tough and soft phases of the feedstock or feedstocks on the substrate, the exemplary methods 110 of forming a TBC on a substrate may include allowing 120 the deposited molten or semi-molten splats of elongate growth domains to cool and solidify to form a TBC on the substrate.

The following examples are illustrative of the exemplary TBCs, and the exemplary methods of forming the exemplary TBCs, disclosed herein.

EXAMPLE 1

Nanocomposite thermal barrier coatings with tough and soft phases in a strain tolerant microstructure, as disclosed herein, were formed on metallic substrates. The metallic substrates were Rene N5 alloy substrates that included about 150 microns of NiCrAlY bondcoat. The bondcoat was applied to the substrates utilizing an air plasma spray process that produced a surface roughness of about 10 micron Ra. A first thermal barrier layer of about an 8 weight percent Y2O3 and about 92 weight percent ZrO2 composition was deposited to a thickness of about 180 microns onto the bondcoated surface. The 8YSZ had a D50 particle size of about 0.6 microns that was suspended in ethanol at about 20 wt % solids using polyethyleneimine as a dispersant (at about 0.2 wt % of the solids).

An air plasma torch was utilized to form a first 8YSZ TBC layer from the 8YSZ suspension on the substrates. In particular, the 8YSZ suspension was injected into a plasma torch through the center tube of a tube-in-tube atomizing injector with a nitrogen atomizing gas sent through the outer tube. An about ⅜ inch diameter nozzle was used at the end of the plasma torch. The 8YSZ suspension was pumped to the injector at a feedrate of about 24 ml/min. The plasma torch was rastered across the substrate at about 600 mm/sec with stripe spacing interval of 4 mm. The spray distance between the torch nozzle and the substrate was about maintained at about 75 mm. The plasma conditions used included about 300 slpm total gas flow with about 30% nitrogen, about 10% hydrogen, and about 60% argon flow ratios. A current of about 180 A was used for each of the three electrodes, resulting in a total gun power of about 100 kW.

A second TBC layer according to the present discourse was made over the top of the first 8YSZ TBC layer by mixing two separate suspensions in a 1:1 ratio by weight. One suspension was the suspension used to form the first 8YSZ TBC layer as described above. The second suspension was 20 percent by weight of $Y_2O_3$ particles in ethanol with a D50 particle size of about 0.5 microns. The two suspensions were mixed together before injection into the plasma torch described above with respect to the first TBC layer. The second TBC layer was deposited using the same plasma conditions as used for the underlying first 8YSZ TBC layer, except that the spray distance was maintained at about 90 mm to produce the desired growth domain microstructure.

EXAMPLE 2

A Hastelloy X substrate with the same NiCrAlY bondcoat as described above in EXAMPLE 1 was over-coated with a first 8YSZ TBC layer of about 500 microns (e.g., as described above). A topcoat of a composite second TBC layer of about 180 micron thickness was applied onto the first 8YSZ TBC layer. The composite TBC was produced by injecting a solution made by mixing, at a 4:1 ratio by weight, first and second ethanol based suspensions. The first suspension included about 20 weight percent of 8YSZ with a D50 particle size of about 0.6 micron particles, and the second suspension included 20 weight percent hafnium oxide, $HfO_2$, with a D50 particle size of about 0.35 microns. The same plasma torch configuration as described above in EXAMPLE 1 was used with plasma conditions of about 300 slpm total gas flow, with about 10% nitrogen, about 15% hydrogen, and about 75% argon flow ratios. A current of about 200 A was used for each of the three electrodes, resulting in a total gun power of about 97 kW. A spray distance of about 75 mm and suspension feedrate of 24 ml/min was utilized for both the first and second TBC layers.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A thermal barrier; coating comprising:
   a plurality of elongate material growth domains defined between domain boundaries,
   wherein the domains have an intra-domain density of at least about 75%, and comprise individual, randomly distributed splats of tough and soft phases stacked throughout the growth domains, and
   wherein the tough phases are at least one of partially stabilized zirconia compositions and partially stabilized hafnia compositions, and the soft phases are at least one of CMAS reactive compositions and CMAS resistant compositions, wherein at least about 75% of the splats of the domains include a width to length aspect ratio of greater than or equal to about 3:1.

2. The thermal harrier coating of claim 1, wherein the widths of the splats are oriented within the range of about 45 degrees to about 90 degrees with respect to at least one of the direction in which tough and soft phases are stacked and the thickness of the thermal barrier coating.

3. The thermal barrier coating of claim 1, wherein the domains have a substantially isotropic crystallographic orientation.

4. The thermal barrier coating of claim 1, wherein the tough phases are at least partially stabilized zirconia compositions that are stabilized by at least one of yttria, magnesia, calcia, ceria, lanthana, neodymia, europia, gadolinia, erbia, dysprosia, ytterbia, scandia, sainaria and lutetia.

5. The thermal barrier coating of claim 1, wherein the tough phases are at least partially stabilized hafnia that are stabilized by at least one of yttria, magnesia, calcia, ceria, lanthana, neodymia, europia, gadolinia, erhia, dysprosia, ytterbia, scandia, samaria and lutetia.

6. The thermal barrier coating of claim 1, wherein the tough phases are 7YSZ and the soft phases are Y2O3.

7. The thermal barrier coating of claim 1, wherein the domains have a thickness in the range from about 5 micrometers to about 150 micrometers.

8. The thermal barrier coating of claim 1, wherein the domains include at least about 75% non-equiaxed grains.

9. The thermal tinnier coating of claim 1, wherein at least 50% of material present in the domains comprises at least partially melted and solidified particles.

10. The thermal barrier coating of claim 1, further comprising a plurality of domain boundaries between the domains, wherein a density of the domain boundaries is less than about 25%.

11. The thermal barrier coating of claim 10, wherein the domain boundaries extend for at least about 50% of a thickness of the coating.

12. The thermal barrier coating of claim 1, wherein the soft phases are molten silicate resistant compositions.

13. The thermal barrier coating of claim 12, wherein the soft phases are oxides selected from the group consisting of hafnia, yttria, ytterbia, zirconia, lanthana, ceria and alumina.

14. The thermal barrier coating of claim 12, wherein the soft phases are at least one of gadolinia and zirconia with a cubic crystal structure.

15. The thermal harrier coating of claim 12, wherein the soft phases are at least one material with a cubic pyrochlore structure.

16. The thermal barrier coating of claim 12, wherein the soft phases are selected from the group consisting of:
   at least one of zirconia, hafnia and titania, which are stabilized with a rare earth material;
   at least one oxide of aluminum, calcium, magnesium, silicon, tantalum, titanium, cerium, praseodymium, neodymium, promethium, samarium, europium, terbium, dysprosium, holmium, erbium, thulium, yttrium, ytterbium, lutetium, scandium, indium, hafnium, gadolinium and mixtures thereof;
   at least one sodium containing compound selected from the group consisting of sodium oxide, sodium silicate, sodium titanate and mixtures thereof;
   at least one garnet;
   at least one titanate mixed with at least one oxide;
   at least one metal carbide;
   at least one metal nitride;
   at least one metal silicide; and
   3-70 mol % gadolinia, balance hafina.

17. An article for use at elevated temperatures, comprising:
   a substrate; and
   a thermal bailer coating according to claim 1 disposed on the substrate.

* * * * *